US011417153B2

(12) United States Patent
Andres et al.

(10) Patent No.: US 11,417,153 B2
(45) Date of Patent: Aug. 16, 2022

(54) SELF-SERVICE REPAIR FOR AUTONOMOUS VEHICLES

(71) Applicant: Continental Automotive Systems, Inc., Auburn Hills, MI (US)

(72) Inventors: Robert M Andres, Clarkston, MI (US); Amit Kapoor, Rochester, MI (US); Dennis Ziesmer, Clarkston, MI (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 236 days.

(21) Appl. No.: 16/682,019

(22) Filed: Nov. 13, 2019

(65) Prior Publication Data

US 2020/0202636 A1 Jun. 25, 2020

Related U.S. Application Data

(60) Provisional application No. 62/783,660, filed on Dec. 21, 2018.

(51) Int. Cl.

| G07C 5/00  | (2006.01) |
| G06Q 10/00 | (2012.01) |
| G05D 1/00  | (2006.01) |
| G06Q 10/02 | (2012.01) |
| G06Q 10/10 | (2012.01) |

(52) U.S. Cl.
CPC ........... *G07C 5/006* (2013.01); *G05D 1/0088* (2013.01); *G06Q 10/109* (2013.01); *G06Q 10/20* (2013.01); *G05D 2201/0213* (2013.01)

(58) Field of Classification Search
CPC .......... G07C 5/006; G07C 5/00; G06Q 10/20; G06Q 10/109; G06Q 10/0631; G06Q 50/30; G06Q 10/00; G06Q 10/02; G05D 1/0088; G05D 2201/0213; G05D 1/00
See application file for complete search history.

(56) References Cited

U.S. PATENT DOCUMENTS

| 10,083,588 B1 | 9/2018 | Kapoor et al. |
| 2009/0024423 A1* | 1/2009 | Hay ........................ G06Q 50/30 705/5 |

(Continued)

OTHER PUBLICATIONS

International Search Report and Written Opinion dated Feb. 26, 2020 for the counterpart PCT Application No. PCT/2019/066180.

*Primary Examiner* — Yonel Beaulieu (57) ABSTRACT

A method of notifying an owner of a fault associated with a vehicle system of a vehicle. The method includes receiving, at a computing processor, one or more fault messages from a vehicle system of the vehicle. Each fault message includes a fault source identifying the vehicle system, a fault time identifying a time of the fault, and a fault description. The method also includes determining, by the computing processor, a fault value associated with the received one or more fault messages. The fault value indicative of a period of time or a number of events from an initial received fault message. The method also includes transmitting, from the computing processor to a third party in communication with the computing processor, the fault value. The method also includes receiving, from the third party, a service notification, and displaying, on a display in communication with the computing processor, the service notification.

20 Claims, 8 Drawing Sheets

(56) References Cited

U.S. PATENT DOCUMENTS

| | | | |
|---|---|---|---|
| 2012/0053778 A1* | 3/2012 | Colvin | G06Q 10/1097 |
| | | | 701/29.4 |
| 2012/0089474 A1* | 4/2012 | Xiao | G06Q 10/06311 |
| | | | 705/26.4 |
| 2015/0348335 A1* | 12/2015 | Ramanujam | G05D 1/0088 |
| | | | 701/23 |
| 2019/0197798 A1* | 6/2019 | Abari | G06Q 10/02 |
| 2020/0043068 A1* | 2/2020 | McQuade | G06Q 30/0611 |
| 2020/0202636 A1* | 6/2020 | Andres | G06Q 50/30 |
| 2020/0302713 A1* | 9/2020 | Thompson | G07C 5/0816 |
| 2020/0363362 A1* | 11/2020 | Melcher | H05B 1/0236 |
| 2021/0012592 A1* | 1/2021 | Abari | G06Q 10/20 |
| 2021/0081908 A1* | 3/2021 | Derouen | G06Q 10/02 |
| 2021/0283885 A1* | 9/2021 | Lozier | B32B 37/182 |

* cited by examiner

SELF-SERVICE REPAIR FOR AUTONOMOUS VEHICLES

CROSS REFERENCE TO RELATED APPLICATIONS

This U.S. patent application claims priority under 35 U.S.C. § 119(e) to U.S. Provisional Application 62/783,660, filed on Dec. 21, 2018, which is hereby incorporated by reference in its entirety.

TECHNICAL FIELD

This disclosure relates to a self-service repair system for autonomous vehicles.

BACKGROUND

In present day, most people own or lease vehicles. They often use these vehicles to commute to work or to school. Upon arrival to their destination, the vehicle is parked and the owner spends an extended period of time at work or in classes. The vehicle sits unused in the parking lot for most of the day. The vehicle owners are often very busy and find it difficult to take their vehicle into a repair shop for routine maintenance or necessary repairs. The day is rapidly approaching for fully autonomous vehicles.

In the near future, fully autonomous vehicles will be driving themselves on roads without owners or occupants. Many people anticipate a shift in the automotive market from vehicle ownership to a service industry where people pay for transportation service instead of an automobile. Autonomous vehicles that provide service must drive themselves to a location to pick up a customer, drive the customer to their destination, and then either drive back to a home location, or drive to pick up the next customer. As with any complex machine, autonomous service vehicles will need routine maintenance and periodic repairs if a system becomes damaged or faulty. There is also the possibility for safety related recalls that need to be addressed. Furthermore, autonomous vehicles may behave differently based on the criticality of a component failing while the vehicle is enroute to its destination. The autonomous vehicle may recognize the failure and pull off the road to a safe position and call for service or it may simply continue along its route until it breaks down and causes a traffic jam. Therefore, it is desirable to have an autonomous vehicle, capable of monitoring its systems and recognizing when it needs repairs and then scheduling a maintenance repair appointment with a repair shop.

SUMMARY

One aspect of the disclosure provides a method of autonomously driving a vehicle to a scheduled repair service. The method includes: receiving, at data processing hardware, a fault message from a vehicle system supported by the vehicle. The fault message is associated with a fault and includes a fault source identifying the vehicle system, a fault time identifying a time of the fault, and a fault description. The method also includes transmitting, from the data processing hardware, to one or more service stations an appointment request via a network in communication with the data processing hardware and the service stations. The method also includes receiving, at the data processing hardware, one or more appointment lists. Each list associated with one of the one or more service stations and includes one or more available repair appointments. The method also includes sending, from the data processing hardware to a drive system in communication with the data processing hardware, instructions to autonomously drive the vehicle to the service station at one of the one or more available repair appointments Implementations of the disclosure may include one or more of the following optional features. In some implementations, the method includes sending, from the data processing hardware to a user interface in communication with the data processing hardware, a first display instruction instructing the user interface to notify an owner of the vehicle of the fault associated with the fault message. The method may also include sending, from the data processing hardware to the user interface an authorization selection to authorize the data processing hardware to send the appointment request to one or more service stations.

In some examples, the method further includes sending, from the data processing hardware to the user interface, a second display instruction instructing the user interface to notify the owner of the vehicle of the received one or more appointment lists. In some examples, the user interface includes a display configured to display the one or more appointment lists. The user interface may include a user device in communication with the data processing hardware via the network.

In some implementations, the method further includes receiving, at the data processing hardware, an authorization code via a user interface. The method may also include verifying, by the data processing hardware, the authorization code being a previously entered authorization code. The method may also include when the authorization code is verified, sending, from the data processing hardware to one or more vehicle systems, instruction to enter a vehicle service mode allowing a service technician to perform vehicle maintenance.

In some examples, the method further includes receiving, at the data processing hardware, an appointment selection via a user interface in communication with the data processing hardware. The appointment selection indicative of an available repair appointment from the one or more available repair appointments. The method may further include transmitting, from the data processing hardware to one of the one or more service stations associated with the appointment selection, a confirmation message confirming one of the one or more available appointments provided by the respective service station. The method may include storing, at hardware memory in communication with the data processing hardware, the fault message. The method where the data processing hardware is in communication with the vehicle system by way of a communication bus.

Another aspect of the disclosure provides a system for autonomously driving a vehicle to a scheduled repair service appointment, the system includes data processing hardware and hardware memory in communication with the data processing hardware. The hardware memory stores instruction that when executed on the data processing hardware cause the data processing hardware to perform operations that include the method described above.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

In the near future, fully autonomous vehicles will be driving themselves on roads without owners or occupants. As with any complex machine, autonomous vehicles will require routine maintenance and periodic repairs if one or more of its systems becomes damaged or faulty. In addition, in some examples, the autonomous vehicle may be recalled for a safety related reason that needs to be addressed. Therefore, it is desirable for the autonomous vehicles to have a repair valet system that monitors the vehicle systems for conditions that need repairs. When the repair valet system identifies one or more conditions that need repair, the repair valet system might perform tasks including, for example, scheduling repair appointments and instructing the vehicle to drive to and from the repair appointment, while keeping the vehicle owner informed about the vehicle status and involving the owner in decisions associated with scheduling the repairs. Therefore, instead of sitting idle in the parking lot all day, the vehicle may drive to a service station for its scheduled maintenance, such as, but not limited to, an oil change, tire rotation or new tire installation, routine maintenance. Once the service station performs the vehicle maintenance, the vehicle may return to the original parking lot before the owner needs to return home.

In some implementations, the repair valet system is supported by a fully autonomous vehicle that includes a telematics system in communication with an electronic control unit (ECU) of the repair valet system. While the vehicle is powered on and in use, the repair valet system periodically checks various vehicle systems for faults and warning messages that need service. The repair valet system may also maintain a record of past repairs and maintenance so that the repair valet system can recommend to the owner/owner of the vehicle when the next routine maintenance is needed based on distance traveled or time elapsed since the last repair. The repair valet system may communicate with a service station to receive repair notices and communicate the received repair notice to the vehicle owner (e.g., via a user device). The message may include information relating to the type of maintenance that the vehicle needs and asks the owner for permission to schedule a repair appointment. With the owner's permission, the repair valet system contacts local service stations to get scheduling options and estimated costs. Once the requested information is received from the service stations, the repair valet system sends all feasible repair options (i.e., options that do not interfere with a calendar of the owner) to the owner. The owner may then select the best option for scheduling the repair. The repair valet system then contacts the selected service station to make the appointment and to provide an authorization code to allow service personnel to access the vehicle upon arrival. At the appointed time, the vehicle drives itself to the service station and notifies the service station of its arrival. Service personnel use the authorization code to gain access to the vehicle and make the necessary repairs. After the repair is successfully complete, the service personnel enter a code via a user interface in communication with the repair valet system. Finally, the vehicle returns to its original location and notifies the owner.

Figure 1:
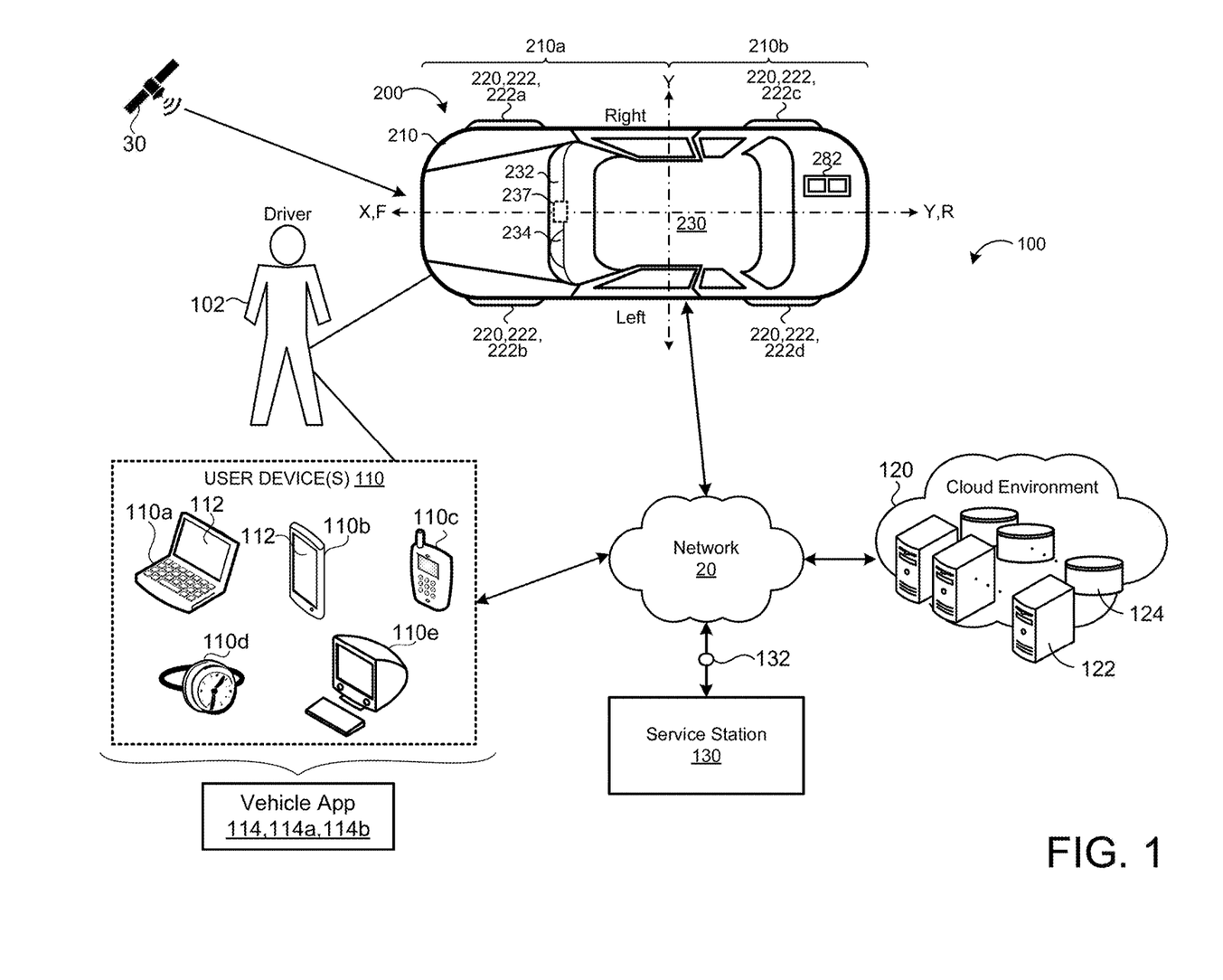
FIG. 1 is a schematic view of an exemplary autonomous vehicle self-service repair system.

FIG. 1 illustrates an autonomous vehicle self-service repair system 100 that includes the vehicle 200 associated with an owner or a driver 102. The autonomous vehicle self-service repair system 100 also includes one or more user devices 110 associated with the owner 102. The vehicle 200 and the user device 110 are in communication with one another and with a remote system 120 via a network 20. The remote system 120 may be a distributed system (e.g., a cloud environment) having scalable/elastic computing resources 122 and/or storage resources 124. The network 20 may include various types of networks, such as a local area network (LAN), wide area network (WAN), and/or the Internet.

In some implementations, the user device 110 is any computing device capable of communicating with the vehicle 200. The user device 110 may include, but is not limited to, a mobile computing device, such as a laptop 110a, a tablet 110b, a smart phone 110c, and a wearable computing device 110d (e.g., headsets and/or watches). The user device 110 may also include other computing devices having other form factors, such as a desktop computer 110e, a gaming device, a television, or other appliances (e.g., networked home automation devices and home appliances).

The user device 110 may use any of a variety of different operating systems. In examples where a user device 110 is a smart phone 110c, the user device 110 may run an operating system including, but not limited to, ANDROID® developed by Google Inc., IOS® developed by Apple Inc., or WINDOWS PHONE® developed by Microsoft Corporation. Accordingly, the operating system running on the user device 110 may include, but is not limited to, one of ANDROID®, IOS®, or WINDOWS PHONE®. In an example where a user device 110 is a laptop or desktop computing device, the user device may run an operating system including, but not limited to, MICROSOFT WINDOWS® by Microsoft Corporation, MAC OS® by Apple, Inc., or Linux.

In some examples, the user device 110 runs a vehicle software application 114 for communicating with the vehicle 200, i.e., a repair valet system 280 supported by the vehicle 200. The vehicle application 114 may be a native vehicle application 114a that is dedicated to interfacing with the vehicle 200; while in other examples, the user device 110 communicates with the vehicle 200 using a more general application 114b such as a web-browser application accessed using a web browser and executed on the remote system 120. A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

Figure 2A:
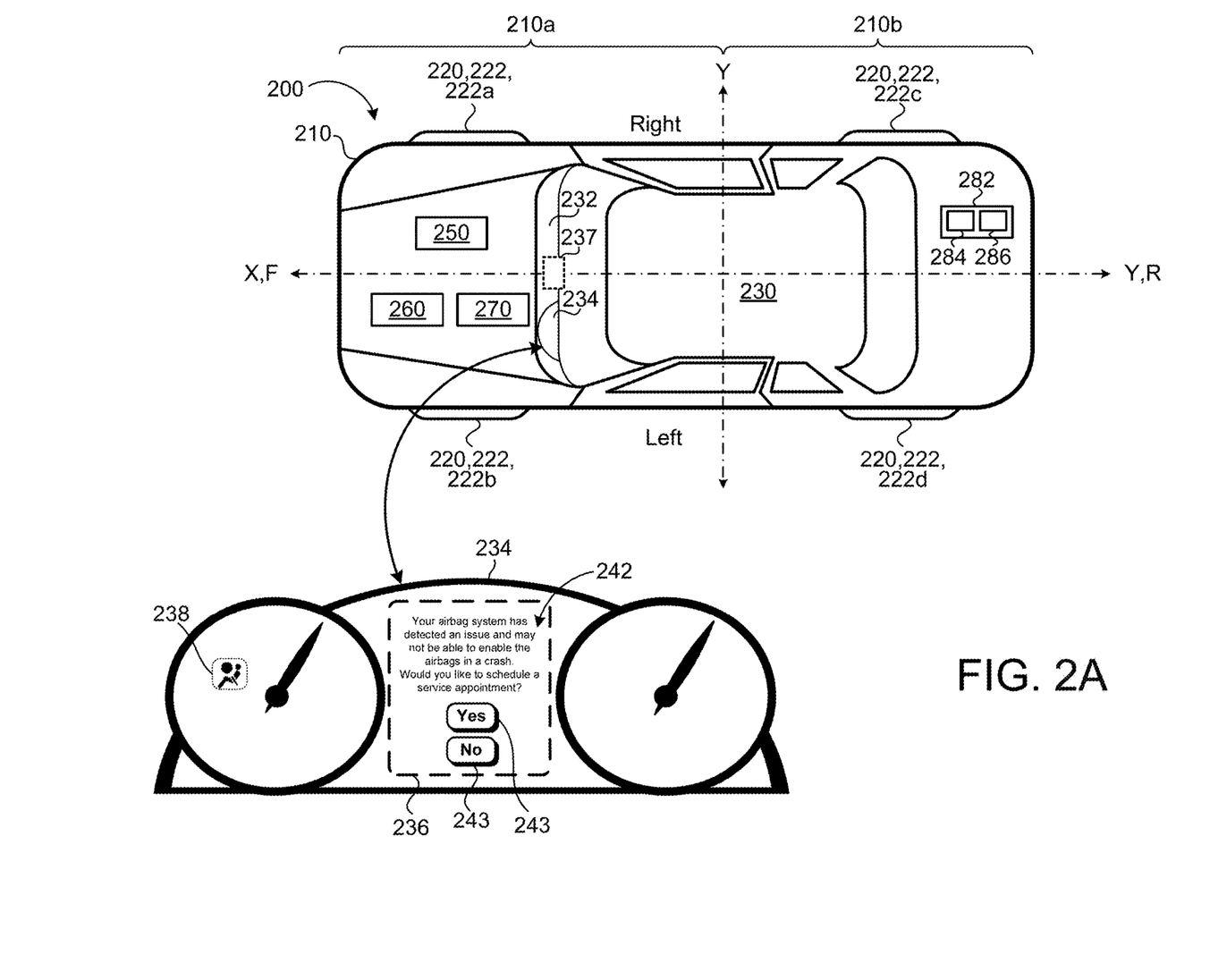
FIGS. 2A and 2B are schematic views of an exemplary vehicle of FIG. 1.
Figure 2B:
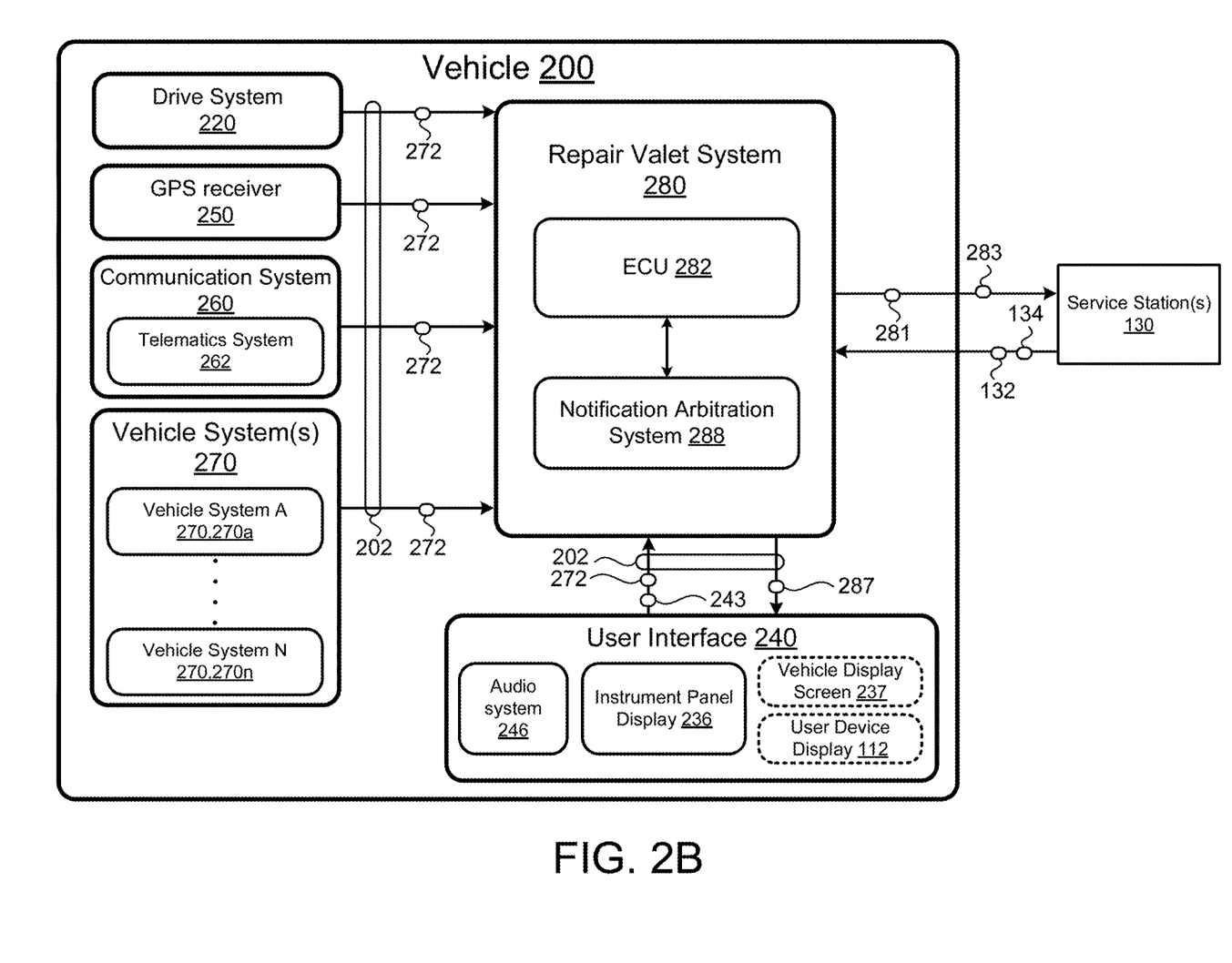

Referring to FIGS. 1-2B, in some implementations, the vehicle 200 includes a vehicle body 210 supported by a drive system 220 that allows the vehicle 200 to drive on a road surface. In some examples, the vehicle body 210 has a forward portion 210a and a rearward portion 210b. The drive system 220 includes wheels 222. For example, the drive system 220 includes forward right wheel 222, 222a, a forward left wheel 222, 222b, a rear right wheel 222, 122c, and a rear left wheel 222, 222d. The forward right wheel 222a and the forward left wheel 222b are positioned substantially opposite one another about a fort-aft axis X defined by the vehicle body 210. In addition, the rear right wheel 222c and the rear left wheel 222d are positioned substantially opposite one another about the transverse axis Y. The drive system 220 may include other wheel 222 configurations as well.

The vehicle body 210 may move along a road through various combinations of movements relative to two perpendicular axis defined by the vehicle body 210: the fore-aft axis X and a transverse axis Y. A forward drive direction along the fore-aft axis X is designated F (sometimes referred to hereinafter as "forward"), and an aft drive direction along the fore-aft axis X is designated R (sometimes referred to hereinafter as "rearward"). The transverse axis Y extends between a right side and left side of the vehicle body 210, substantially defined by center points between both the forward right wheel 222a and the forward left wheel 222b and both the rear right wheel 222c and the rear left wheel 222d.

The vehicle body 210 defines a passenger compartment 230 configured to allow one or more passengers to sit in the vehicle 200 and/or allow one of the passengers to drive or semi-drive the vehicle 200 (i.e., for semi-autonomous vehicles). The vehicle 200 may include a dashboard 232 extending over a width of the passenger compartment 230 in front of one or more seats positioned in the forward portion 210a of the vehicle body 210. For example, the dashboard 232 extends over the width of the passenger compartment 230 in front of the owner and passenger seats.

The dashboard 232 may include an instrument panel 234 that includes instrumentations to show speed (i.e., speedometer), a tachometer, fuel levels, oil pressure, turn signals, climate control, light-on indicator, and entertainment system among others. In addition, the instrument panel 234 may include a display 236 that may also display a warning light indicator 238, such as information light icons which are usually green, blue, or white and indicate that a system associated with the displayed warning light indicator 238 is on. The warning light indicator 238 may be a warning light icon that is usually yellow or orange and indicates that the vehicle 200 needs to be serviced or needs repairs soon. In some examples, the warning light indicator 238 is an alert light icon which is usually red and indicates that the vehicle 200 has serious or safety issues and should not be driven. Some of these warning light indicators 238 include, but are not limited to, seat belt not on, parking brake, airbag warning, engine temperature, low tire pressure, battery or alternator warning, check engine emissions warning, door open, suspension damper, traction control or ESP (electronic stability program), low oil pressure, and distance warning. As shown in FIG. 2A, the displayed warning light indicator 238 is an airbag warning indicator indicating that the airbag system of the vehicle 200 has an issue or fault.

Since owners might ignore the warning that the warning light indicator 238 provides, the vehicle 200 includes a user interface 240 that provides the owner with additional information associated with the display warning light indicator 238. The user interface 240 may include the instrument panel display 234 that is part of the instrument panel 234 (as shown) or separate from the instrument panel, for example, a Heads-Up-Display or a display screen 237 supported by the dashboard 232. The display screen 237 may be positioned in a center portion of the dashboard 232 and may be used for displaying images from a rear-view camera, displaying maps for navigation, displaying vehicle and/or audio-visual settings. In some examples, the user interface 240 includes a user device display 112 of a user device 110 that is in communication with the vehicle 200. The user interface 240 may be a touch screen that allows the owner to touch the screen for interacting with the user interface 240, while in other examples, the user interface 240 is configured to receive an owner input from one or more sources, such as but not limited to, an input keyboard, a rotary dial, one or more keys on a steering wheel supported by the dashboard 232.

Figure 3A:
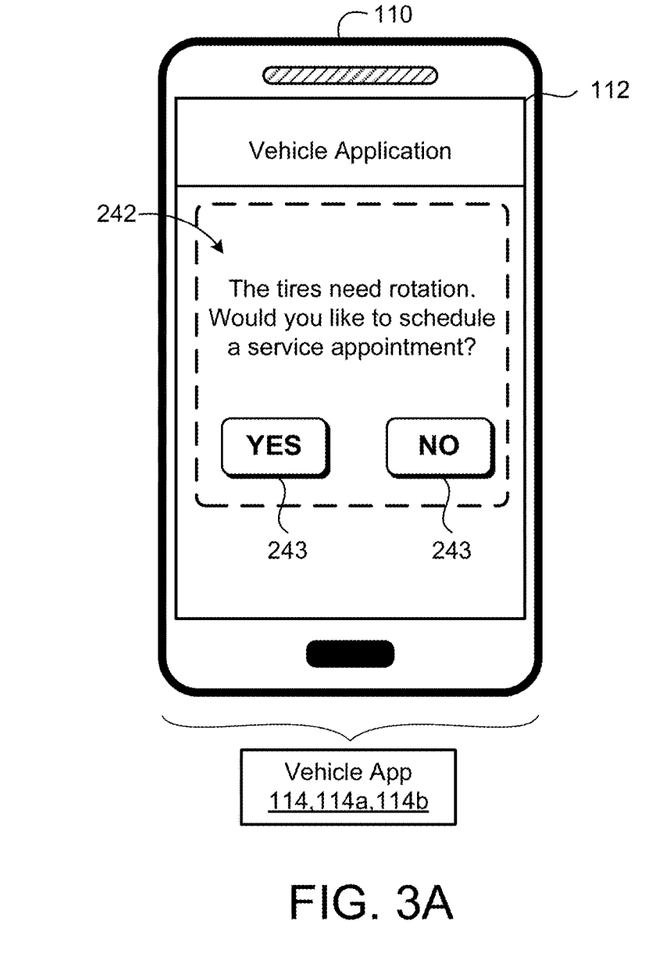
FIGS. 3A and 3B are schematic views of an exemplary user device screen displaying a notification message.
Figure 3B:
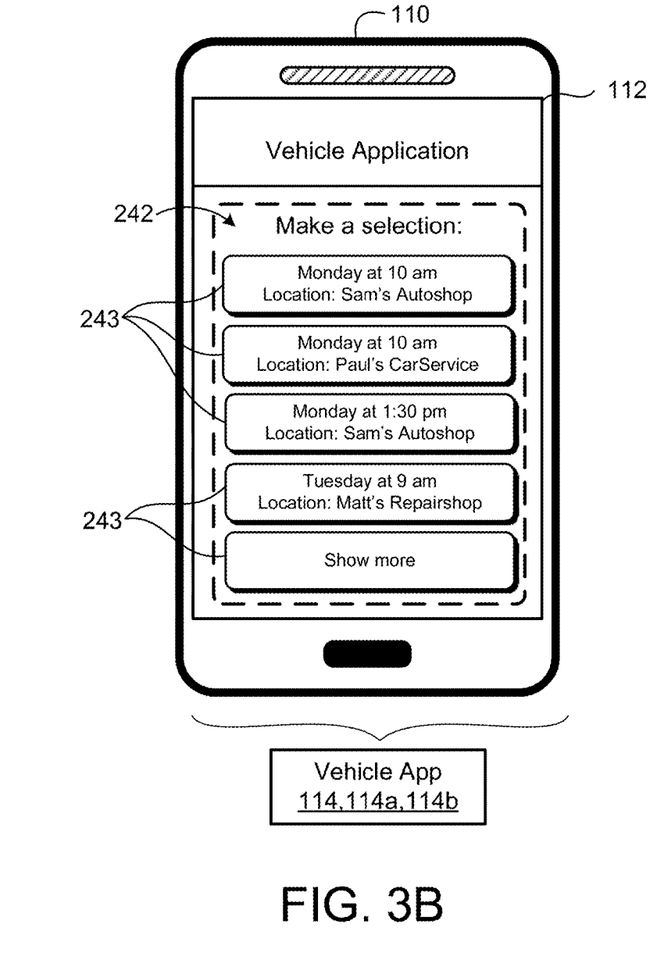

As shown in FIG. 2A, the display warning light indicator 238 is an airbag warning icon and the displayed message 242 provides more information about the airbag display warning light indicator 238. In addition, as shown, the displayed message 242 includes an acknowledgement button 243 that allows the owner to either press the button (when the user interface 240 is a touch screen interface) or select the button 243 (by way of a physical button input, for example on the steering wheel). The acknowledgement button 243 may include a YES button and a NO button that allows the owner 102 to answer a question. In some examples, the display message 242 is also displayed on the dashboard display screen 237 or on the user device display 112 (as shown in FIGS. 3A and 3B).

With continued reference to FIGS. 1-2B, in some implementations, the vehicle 200 includes a global positioning system (GPS) receiver 250 that receives information from one or more GPS satellites 30 and then calculates a geographical position of the vehicle 200 based on the received information. The GPS receiver 250 continuously calculates the position of the vehicle 200 so that the vehicle 200 knows its location while autonomously driving along a road to a destination.

The vehicle 200 may also include a communication system 260 that allows for communication between the vehicle 200 and the user device(s) 110, a service station 130, the network 20, the remote system 120, and/or other vehicles. In some examples, the communication system includes a telematics system 262 in communication with the GPS receiver 250 and other vehicle systems (e.g., drive system 220). The telematics system 262 receives information such as the GPS position from the GPS receiver 250 and the wheel speed associated with the wheels 222 of the drive system 220 and based on the received GPS position and the wheel speed, the telematics system 262 positioned the vehicle 200 on a virtual geographic map of an area associated with a current location of the vehicle 200.

In some examples, the vehicle 200 includes additional vehicle systems 270, 270a-n such as, but not limited to, an engine system, a powertrain system, body and security system, safety system, brakes system, sensor system, to name a few. Each one of the vehicle systems 270, 270a-n includes an electronic control unit (ECU) (not shown).

The vehicle 200 also includes the repair valet system 280 in communication with the drive system 220, the user interface 240, the GPS receiver 250, the communication system 260, and the other vehicle systems 270, 270a-n. The repair valet system 280 includes an electronic control unit (ECU) 282 including a computing processor 284 (e.g., a central processing unit) in communication with non-transitory memory 286 (e.g., a hard disk, flash memory, random-access memory, hardware memory, to name a few). The non-transitory memory 286 stores instructions that when executed by the computing processor 284 cause the ECU 282, i.e., the repair valet system 280 to perform an action. In some examples, the repair valet system 280 is a stand-alone controller having its respective computing processor 282 and hardware memory 284; while in other examples, the repair valet system 280 is a combination of one or more ECUs, and therefore has one or more ECU hardware processors in communication with one or more ECU non-transitory memory capable of storing instructions executable on the one or more ECU hardware processors.

The repair valet system 280 monitors a vehicle's shared communication bus 202 and analyzes communications from the vehicle systems 220, 240, 250, 260, 270 to identify a fault message 272 associated with one of the vehicle systems 220, 240, 250, 260, 270. In addition, the repair valet system 280 may receive a recall notice signal 132 from a service station 130 in communication with the repair valet system 280 via the network 20. Once the repair valet system 280 identifies a fault message 272 or a recall message 132, then the repair valet system 280 informs the owner 102, via an instruction 287 to the user interface 240 to display a message 242 indicative of the fault associated with the fault message 272 or the recall message 132. Moreover, the repair valet system 280 communicates, via the network 20, with one or more service stations 130 to schedule a repair associated with the fault associated with the fault message 272 or recall message 132. In some examples, the repair valet system 280 identifies more than one fault message 272 and/or recall message 132 associated with one or more vehicle systems 220, 240, 250, 260, 270. In this case, a notification arbitration system 288 provides a prioritization mechanism between the faults associated with the fault messages 272 and/or recall messages 132 to allow the user interface 240 to display the critical faults before the less critical faults, since in some examples, a service station 130 cannot handle all the repairs associated with the vehicle 200.

Each fault message 272 or recall message 132 includes, one or more of, a vehicle system identifier or source identifying which vehicle system 220, 240, 250, 260, 270 the fault message 272 is associated with or the recall message 132 affects, a fault time, and a fault description which identifies the type of fault or the type of the recall. For example, a fault message 272 may include a vehicle system identifier identifying the drive system 220 to have the fault associated with a fault message 272, and the fault identifier may include information relating to the front right tire 122a having low pressure. Based on the fault data of the received fault message 272, the repair valet system 280 determines which instruction 287 to send the user interface 240 for displaying a message 242 to the owner 102.

The repair valet system 280 instructs the user interface 240 to display a scheduling message 242 associated with the fault message 272 or recall message 132. In some examples, the user interface 240 includes an audio system 246 that outputs a sound associated with the scheduling message 242. In some examples, the scheduling message 242 also includes an acknowledgment button 243 that allows the owner 102 to acknowledge receipt of the message by interacting with the user interface 240, e.g., pressing the YES or No button 243 after reading the scheduling message 242. In some examples, the scheduling message 242 also asks the owner 102 if the repair valet system 280 should request available service appointments from one or more service stations 130 to repair the vehicle system 220, 240, 250, 260, 270 associated with the fault message 272 or recall message 132.

Referring to FIGS. 3A and 3B, in some implementations, the repair valet system 280 communicates with the user device 110 via the network 20, e.g., by way of the vehicle application 114, 114a, 114b. As such, the repair valet system 280 instructs the user interface 240, i.e., the user device 110, to display the scheduling message 242 on the display 112 of the user device 110. The vehicle application 114, 114a, 114b allows for interaction between the user device 110 and the owner 102; therefore, the owner 102 can confirm the request for service of the scheduling message 242 using the user device 110 by selection one of two options, the YES button 243 or the NO button 243. The user device 110 transmits the selection to the repair valet system 280, which in turn sends a service appointment request 281 via the network 20 to the repair valet system 280 if the owner selected the YES button 243. The service stations 130 receive the service appointment request 281 from the vehicle 200, i.e., the repair valet system 280, and each service station 130 transmits an availability list 134 including one or more available times that the respective service station 130 can repair the vehicle 200.

The repair valet system 280 receives the service station availability list 134 and instructs the user interface 240 to display the availability list 134 allowing the owner 102 to make a selection from an availability associated with a respective service station 130. The owner 102 may make a selection from the availability list 134, which the repair valet system 280 sends a message to the selected service station 130 confirming the time and date of the scheduled repair.

Figure 4A:
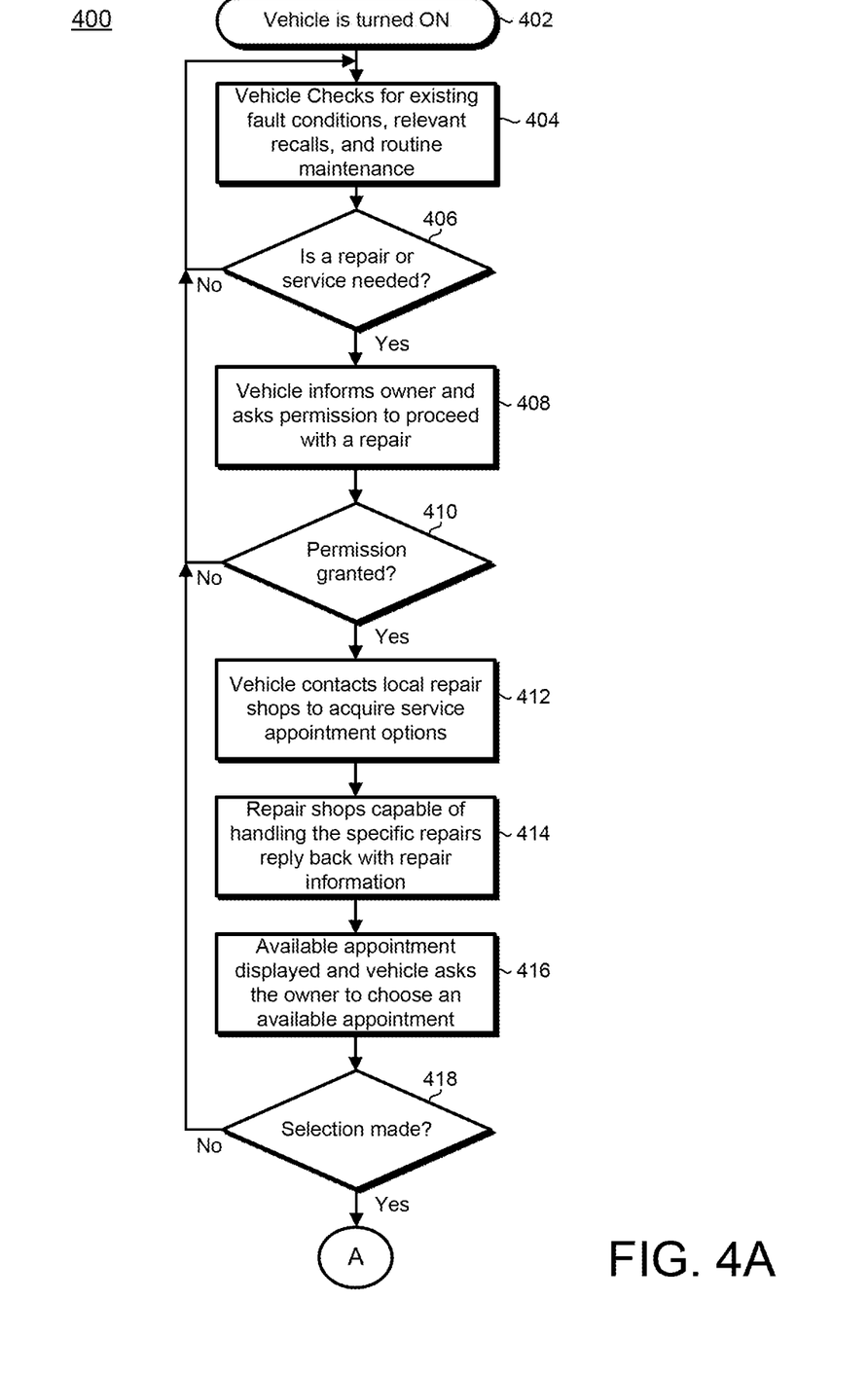
FIGS. 4A and 4B are a schematic view of an exemplary arrangement of operations for a method of scheduling a repair appointment and driving to the repair appointment.
Figure 4B:
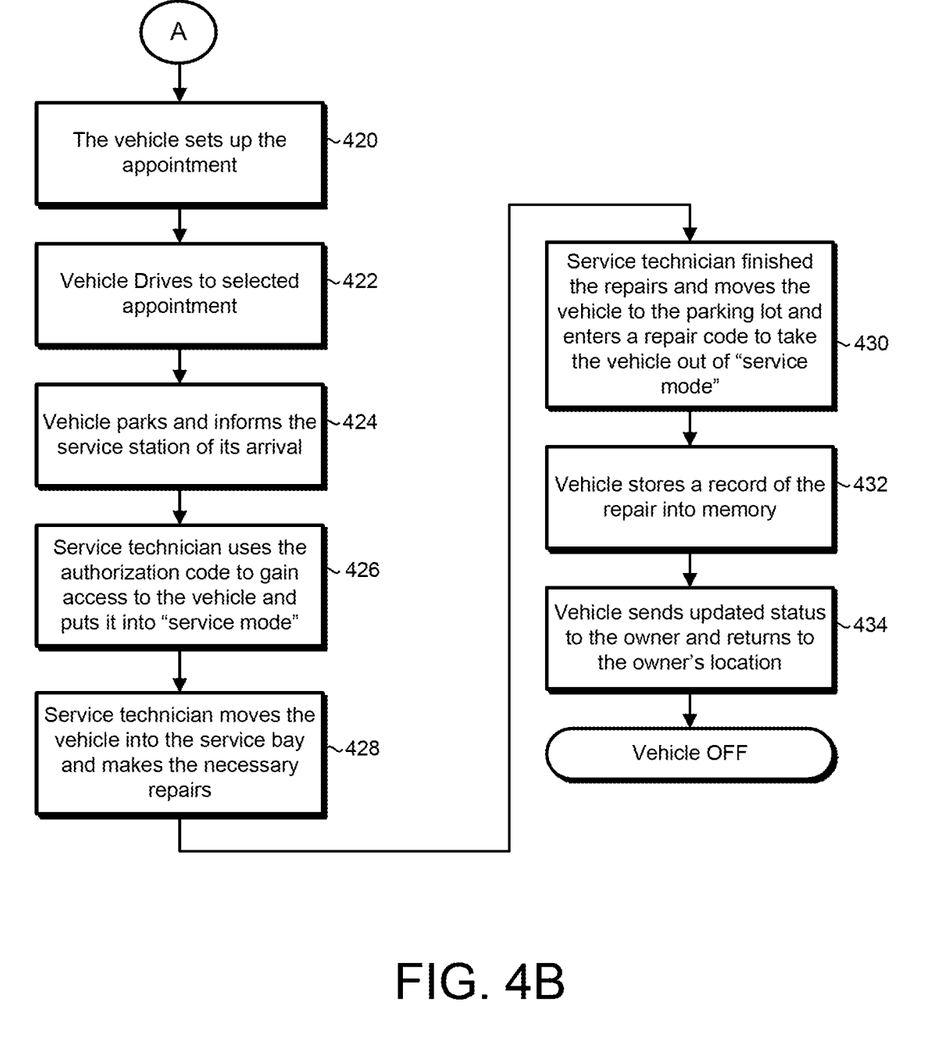

FIGS. 4A and 4B illustrate an exemplary block diagram 400 of operating the vehicle 200 and notifying the owner 102 of one or more faults associated with one or more vehicle systems 220, 240, 250, 260, 270 and scheduling a repair as described in FIGS. 1-3B. At block 402, the vehicle 200 (i.e., the autonomous vehicle) starts. In some examples, a vehicle owner 102 may start the vehicle 200 while sitting inside the passenger compartment 230 or may start the vehicle 200 remotely. In other examples, the vehicle 200 may autonomously start due to a scheduled start time previously scheduled by the owner 102. Once the vehicle 200 is turned on, then all the vehicle systems 220, 240, 250, 260, 270 initiate and at block 404, the repair valet system 280 checks for existing fault conditions that are either identified by analyzing the vehicle bus messages 272, by receiving data from the service stations 130, or by a log of routine maintenance. At decision block 406, the repair valet system 280 determines if a repair service is needed. If not, then the repair valet system 280 keeps checking for faults every predefined interval of time, e.g., 5 mins until the repair valet system 280 identifies a fault or the vehicle is turned off. If at decision block 406, the repair valet system 280 determines that a repair service is needed, then at block 408 the repair valet system 280 instructs the user interface 240 to display a message 242 on the display 112, 236, 237 of the user interface 240 informing the owner 102 of the fault. The displayed message 242 may include information associated with the fault, information associated with the vehicle system causing the fault, and a question asking if the owner 102 wants the repair valet system 280 to collect information from one or more service stations 130 that are available to perform the repair. At decision block 410, the repair valet system 280 determines if the owner 102 provided permission for the repair valet system 280 to request a list 134 of available repair time slots from the service stations 130. If no permission was granted by the owner 102, then the repair valet system 280 goes back to block 404. In some examples, the repair valet system 280 instructs the user interface 240 to display a message every predefined period of time reminding the owner 102 of the identified fault and the need to repair the fault. In some examples, the repair valet system 280 categorizes the faults and based on a fault category, the predefined period of time between each message display becomes shorter.

Referring back to decision block 410, if the owner 102 provides permission to retrieve scheduling information from the service stations 130 via the user interface 240, then, at block 412, the repair valet system 280 instructs the communication system 260 to send a service request message 281 to the one or more service stations 130, for example, service stations within a predefined mile radius of the location of the vehicle 200 or near the owner's home address (previously stored on the non-transitory memory 286) or the owner's work address (also previously stored on the non-transitory memory 286). The service request message 281 includes a request to the service station 130 to provide their available appointments to perform a service. In some examples, the service request message 281 includes information regarding the vehicle 200, the vehicle system 220, 240, 250, 260, 270 associated with the fault, and details of the fault. In this case, as shown in block 414, the service stations 130 capable of handling the fault respond with a list 134 of available times that they can perform the service(s).

Once the list 134 of available appointments is received at the communication system 260, at block 416, the repair valet system 280 instructs the user interface 240 to display the list 134 of available appointments as shown in FIG. 3B and asks the owner 102 to make a selection from the one or more options displayed on the display 112. At decision block 418, the repair valet system 280 determines if the owner 102 made a selection. If no selection is made, then the repair valet system 280 goes back to block 404. However, at block 418 the repair valet system 280 receives a selection from the owner 102 via the user interface 240, then at block 420 the repair valet system 280 communicates with the service station 130 (via the communication system over the network 20) to set up the selected appointment. In some examples, the repair valet system 280 sends the service station 130 a service authorization code 283 and confirms the service appointment.

At block 422, the vehicle 200 autonomously drives to the selected service station 130 for the owner selected service appointment. Then at block 424, the vehicle 200 parks at the service station 130 parking lot and the repair valet system 280 informs the service station 130 (via the communication system 260) of its location and that it has arrived for its service. At block 426, a service technician inputs the authorization code 283 previously received form the repair valet system 280 to enter a vehicle service mode. Then at block 428, the service technician moves the vehicle 200 to a service bay to begin servicing the vehicle 200. Once the service technician completes the repairs, at block 430, the service technician moves the vehicle 200 back to the parking lot of the service station 130. In some examples, the technician enters a repair code via the vehicle user interface 240 indicative of the completion of the repair. The repair code may include repair details such as the type of repair, the time and date of the repair, and the vehicle system 270 affected by the repair. Once entered, at block 432 the repair valet system 280 stores the entered information into memory 286 to maintain a record of all the vehicle repairs performed. At block 434, the repair valet system 280 sends an updates status via the network 20 to the user device 110 indicative of the complete repair. In some examples, the updated status includes an estimated time of arrival back at the location where the owner 102 left the vehicle 200 prior to leaving for repairs. The repair valet system 280 instructs the vehicle 200 to autonomously drive back to the initial location. Once the vehicle 200 is back at the initial location, the vehicle 200 turns off and waits for its next scheduled drive.

Figure 5:
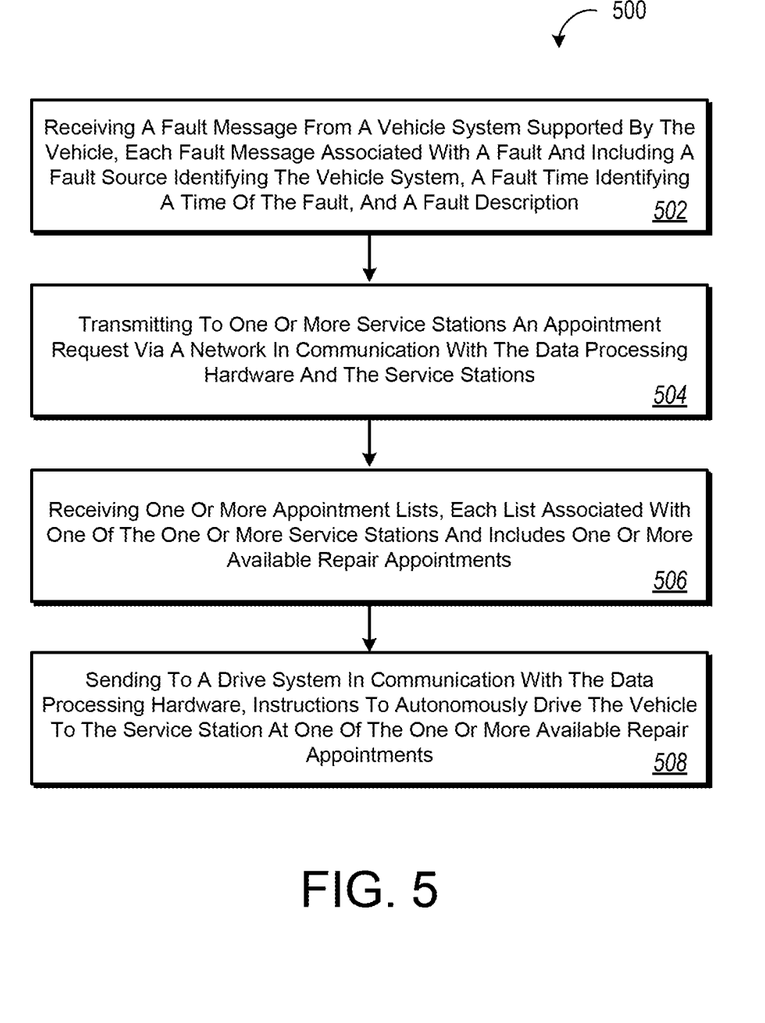
FIG. 5 is a schematic view of an exemplary arrangement of operations for a method of autonomously driving a vehicle to a scheduled repair service appointment at a service station.

FIG. 5 provides an exemplary arrangement of operations for a method 500 of autonomously driving a vehicle 200 to a scheduled repair service appointment at a service station 130. The vehicle 200 supporting a repair valet system 280 including an ECU 282 having data processing hardware 284 and hardware memory 286 in communication with the data processing hardware 284 described in FIGS. 1-4B. At block 502, the method 500 includes receiving, at the data processing hardware 284, a fault message 272 from a vehicle system 220, 240, 250, 260, 270 supported by the vehicle 200. Each fault message 272 is associated with a fault of the respective vehicle system 220, 240, 250, 260, 270 and includes a fault source identifying the vehicle system 220, 240, 250, 260, 270, a fault time identifying a time of the fault, and a fault description. At block 504, the method 500 includes transmitting, from the data processing hardware 284, to one or more service stations 130 an appointment request 281 (e.g., service request message) via a network 20 in communication with the data processing hardware 284 and the service stations 130. The appointment request 281 indicative of a request to transfer a list 134 of available appointments that the service station 130 can repair the fault associated with the vehicle 200. At block 506, the method 500 includes receiving, at the data processing hardware 284, one or more appointment lists 134 from the service stations 130. Each list 134 associated with one of the one or more service stations and includes one or more available repair appointments. At block 508, the method 500 includes sending, from the data processing hardware 284 to a drive system 220 in communication with the data processing hardware 284, instructions to autonomously drive the vehicle 200 to the service station 130 at one of the one or more available repair appointments.

In some implementations, the method 500 includes sending, from the data processing hardware 284 to a user interface 240 in communication with the data processing hardware 284, a first display instruction 287 instructing the user interface 240 to notify an owner 102 of the vehicle 200 of the fault associated with the fault message 272. The method 500 may also include sending, from the data processing hardware 284 to the user interface 240 an authorization selection 243 to authorize the data processing hardware 284 to send the appointment request to the one or more service stations 130. The method 500 may include sending, from the data processing hardware 284 to the user interface 240, a second display instruction 287 instructing the user interface 240 to the owner 102 of the vehicle 200 of the received one or more appointment lists 134. In other words, the second display instruction 287 cause the user interface 240 to display the received one or more appointment lists 134. The user interface 240 may include a display 112 configured to display the one or more appointment lists 134. Additionally, the user interface 240 may include a user device 110 in communication with the data processing hardware 284 via a network 20. In some examples, the user interface 240 may be an instrument panel display 236 being part of the vehicle instrument panel 234, a vehicle display 237, and/or the user device display 112.

In some examples, the method 500 includes receiving from the owner 102, at the data processing hardware 284, an authorization code 283 via the user interface 240.

The method 500 includes verifying, by the data processing hardware 284, the authorization code 283 being a previously entered authorization code 283. In some examples, the previously entered code is a code entered by the owner 102 when scheduling the service appointment, for example. The authorization code 283 allows the service technician to service the vehicle 200. In some example, when the authorization code 283 is verified, the method 500 includes sending, from the data processing hardware 284 to one or more vehicle systems 220, 240, 250, 260, 270, instructions to enter a vehicle service mode allowing a service technician to perform vehicle maintenance.

The method 500 may also include receiving, at the data processing hardware 284, an appointment selection 243 via the user interface 240 in communication with the data processing hardware 284. The appointment selection 243 indicative of an available repair appointment from the one or more available repair appointments. The method 500 may also include transmitting, from the data processing hardware 284 to one of the one or more service stations 130 associated with the appointment selection 243, a confirmation message confirming one of the one or more available appointments provided by the respective service station 130.

In some implementations the method 500 includes storing, at hardware memory 286 in communication with the data processing hardware 284, the fault message. The data processing hardware 284 may monitor the stored fault messages and in some examples, notify the owner 102 if a fault associated with a fault message has not been repaired. In some examples, the data processing hardware 284 is in communication with the vehicle system 220, 240, 250, 260, 270 by way of a communication bus 202.

Figure 6:
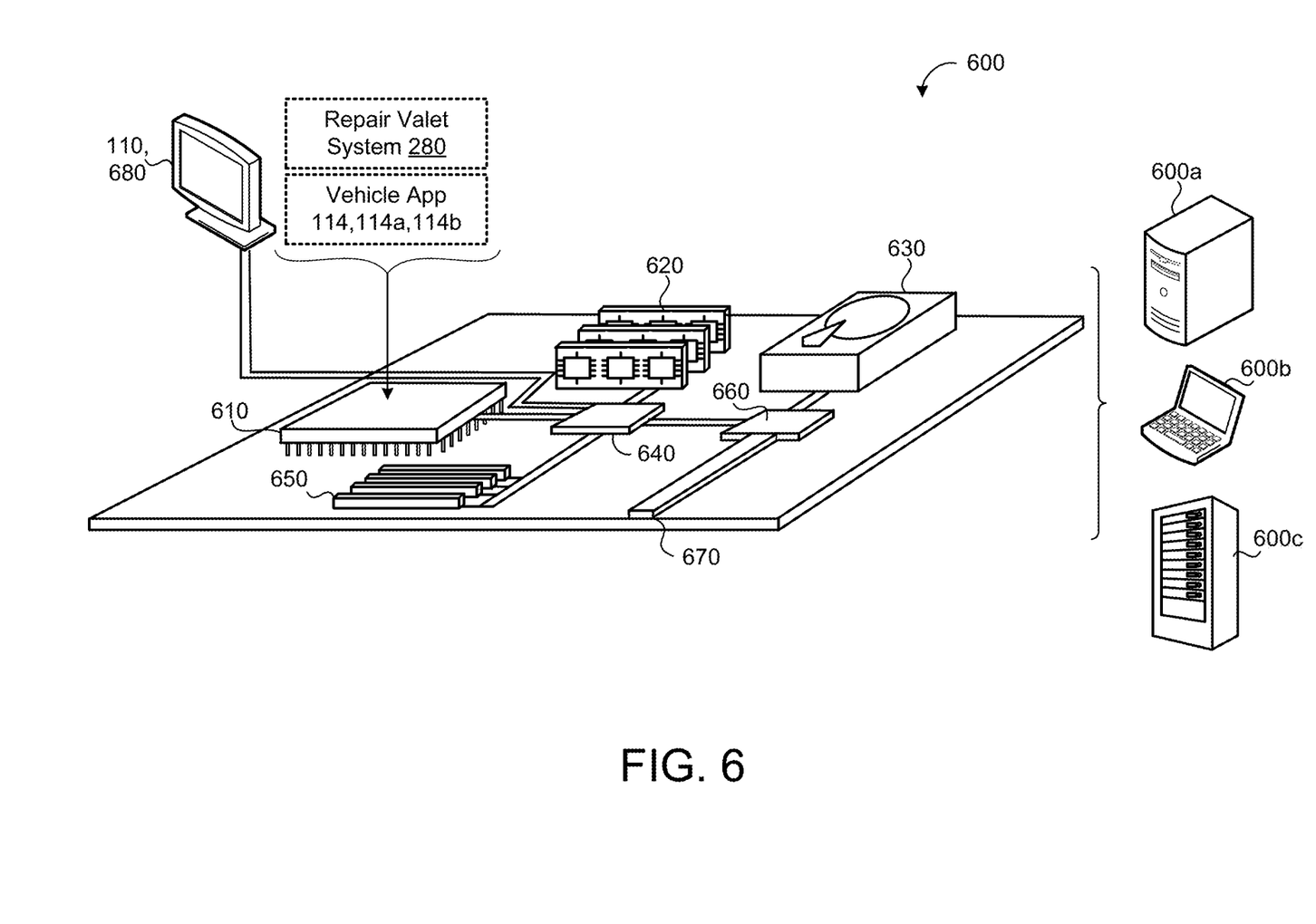
FIG. 6 is a schematic view of an example computing device executing any system or methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to low speed bus 670 and storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 110, 110, 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and low-speed expansion port 670. The low-speed expansion port 670, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, or as part of a rack server system 600*c*.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method of autonomously driving a vehicle to a scheduled repair service, the method comprising:
   receiving, at data processing hardware, a fault message from a vehicle system supported by the vehicle, the fault message associated with a fault and including a fault source identifying the vehicle system, a fault time identifying a time of the fault, and a fault description;
   transmitting, from the data processing hardware to one or more service stations, an appointment request via a network in communication with the data processing hardware and the one or more service stations;
   receiving, at the data processing hardware, one or more appointment lists, each list associated with one of the one or more service stations and includes one or more available repair appointments;
   sending, from the data processing hardware to a drive system in communication with the data processing hardware, instructions to autonomously drive the vehicle to the service station at one of the one or more available repair appointments,
   receiving, at the data processing hardware, an authorization code from a user of the vehicle via a user interface;
   verifying, by the data processing hardware, the authorization code being a previously entered authorization code; and
   when the authorization code is verified, sending, from the data processing hardware to one or more vehicle systems, an instruction to enter a vehicle service mode allowing a service technician to perform vehicle maintenance.

2. The method of claim 1, further comprising:
   sending, from the data processing hardware to a user interface in communication with the data processing hardware, a first display instruction instructing the user interface to notify an owner of the vehicle of the fault associated with the fault message; and
   sending, from the data processing hardware to the user interface an authorization selection to authorize the data processing hardware to send the appointment request to one or more service stations.

3. The method of claim 2, further comprising sending, from the data processing hardware to the user interface, a second display instruction instructing the user interface to notify the owner of the vehicle of the received one or more appointment lists.

4. The method of claim 2, wherein the user interface comprises a display configured to display the one or more appointment lists.

5. The method of claim 4, wherein the user interface includes a user device in communication with the data processing hardware via the network.

6. The method of claim 1, further comprising receiving, at the data processing hardware, an appointment selection via a user interface in communication with the data processing hardware, the appointment selection indicative of an available repair appointment from the one or more available repair appointments.

7. The method of claim 6, further comprising transmitting, from the data processing hardware to one of the one or more service stations associated with the appointment selection, a confirmation message confirming one of the one or more available appointments provided by the respective service station.

8. The method of claim 1, further comprising storing, at hardware memory in communication with the data processing hardware, the fault message.

9. The method of claim 1, wherein the data processing hardware is in communication with the vehicle system by way of a communication bus.

10. A system for autonomously driving a vehicle to a scheduled repair service appointment, the system comprising:
   data processing hardware;
   hardware memory in communication with the data processing hardware, the hardware memory storing instruction that when executed on the data processing hardware cause the data processing hardware to perform operations comprising:
      receiving a fault message from a vehicle system supported by the vehicle, each fault message associated with a fault and including a fault source identifying the vehicle system, a fault time identifying a time of the fault, and a fault description;
      transmitting to one or more service stations an appointment request via a network in communication with the data processing hardware and the service stations;
      receiving one or more appointment lists, each list associated with one of the one or more service stations and includes one or more available repair appointments;
      sending to a drive system in communication with the data processing hardware, instructions to autonomously drive the vehicle to the service station at one of the one or more available repair appointments;

receiving an authorization code from a user of the vehicle via a user interface;

verifying the authorization code being a previously entered authorization code; and when the authorization code is verified, sending to one or more vehicle systems, instruction to enter a vehicle service mode allowing a service technician to perform vehicle maintenance.

11. The system of claim 10, further comprising a user interface in communication with the data processing hardware.

12. The system of claim 11, wherein the operations further comprise:

sending to the user interface a first display instruction instructing the user interface to notify an owner of the vehicle of the fault associated with the fault message; and sending to the user interface an authorization selection to authorize the data processing hardware to send the appointment request to the one or more service stations.

13. The system of claim 12, wherein the operations further comprise sending to the user interface, a second display instruction instructing the user interface to notify the owner of the vehicle of the received one or more appointment lists.

14. The system of claim 11, wherein the user interface comprises a display configured to display the one or more appointment lists.

15. The system of claim 14, wherein the user interface includes a user device in communication with the data processing hardware via the network.

16. The system of claim 10, wherein the operations further comprise receiving an appointment selection via a user interface in communication with the data processing hardware, the appointment selection indicative of an available repair appointment from the one or more available repair appointments.

17. The system of claim 16, wherein the operations further comprise transmitting, from the data processing hardware to one of the one or more service stations associated with the appointment selection, a confirmation message confirming one of the one or more available appointments provided by the respective service station.

18. The system of claim 10, wherein the hardware memory stores the fault message.

19. The method of claim 1, wherein the one or more service stations comprise a plurality of service stations, and the method further comprises receiving, at the data processing hardware, an appointment selection from the user of the vehicle via a user interface in communication with the data processing hardware, the appointment selection indicative of an available repair appointment from the one or more available repair appointments, wherein the instructions comprise instructions to autonomously drive the vehicle to the service station associated with the appointment selection.

20. The method of claim 1, further comprising:

receiving, at the data processing hardware, a recall notice signal;

transmitting, from the data processing hardware to the one or more service stations, an appointment request for servicing the recall identified in the recall notice signal;

receiving, at the data processing hardware, one or more recall appointment lists, each list associated with one of the one or more service stations and includes one or more available recall repair appointments;

sending, from the data processing hardware to a drive system in communication with the data processing hardware, instructions to autonomously drive the vehicle to the service station at one of the one or more available recall appointments, receiving, at the data processing hardware, a second authorization code from a user of the vehicle via a user interface;

verifying, by the data processing hardware, the second authorization code being a previously entered authorization code; and when the second authorization code is verified, sending, from the data processing hardware to one or more vehicle systems, an instruction to enter a vehicle service mode allowing a service technician to perform vehicle recall maintenance.

* * * * *